3,526,620
PROCESS FOR THE PREPARATION OF N-VINYL-
CARBOXYLIC ACID AMIDES
Herbert Bestian, Frankfurt am Main, and Horst Schnabel,
 Hofheim, Taunus, Germany, assignors to Farbwerke
 Hoechst Aktiengesellschaft vormals Meister Lucius &
 Bruning, Frankfurt am Main, Germany, a corporation
 of Germany
No Drawing. Filed Aug. 21, 1967, Ser. No. 661,825
Claims priority, application Germany, Aug. 26, 1966,
F 50,037
Int. Cl. C07d 27/06, 29/42, 41/06, 103/48
U.S. Cl. 260—239.3                                    3 Claims

ABSTRACT OF THE DISCLOSURE

Preparation of N-vinyl carboxylic acid amides by reaction of acetaldehyde with carboxylic acid amides and splitting the N-($\alpha$-hydroxyethyl)-compounds so obtained by heating them in the presence of acidic catalysts forming N-vinyl amides. The novel process is distinguished by the fact that the N-vinyl amides are obtained in a fast proceeding reaction and in high space-time yields.

---

It is known that pyrrolidone reacts with acetaldehyde in the presence of acid catalysts at elevated temperature to form ethylidene-bis-pyrrolidone (Monatshefte f. Chemie, 87, Seite 367 (1956)). It is known, too, that vinyl amides can be obtained by the splitting of N-($\alpha$-alkoxyethyl)-amides. However, the starting substances must first be prepared in the pure state (French Pat. No. 1,421,336).

It has now been found, that vinyl carboxylic acid amides of the general formula

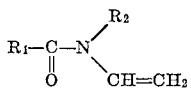

wherein $R_1$ represents a hydrogen atom, an alkyl group, preferably with 1 to 4 carbon atoms, a cyclo alkyl-, aryl- or aralkyl group, and $R_2$ represents an alkyl group containing 1 to 4 carbon atoms, and $R_1$ and $R_2$ may be linked as to form a ring of 5 to 8 ring members, can be obtained by reacting first amides of the general formula

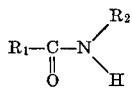

wherein $R_1$ and $R_2$ have the meanings given above, with acetaldehyde to form N-($\alpha$-hydroxyethyl)-compounds and by splitting said compounds subsequently by heating in the presence of acid catalysts into the corresponding vinyl amides.

Suitable starting substances are, for instance, N-methylformamide, N-ethylformamide, N-methylacetamide, N-methyl propionamide, pyrrolidone-2, piperidone-2, and $\epsilon$-caprolactam.

The first stage of the process consists in reacting the amide with acetaldehyde, preferably in the presence of catalysts, to form N-($\alpha$-hydroxyethyl)-amide. The refractive index increases thereby. The reaction temperature should not be over 90° C. Advantageously it ranges from 20°–90° C., preferably from 30°–70° C. If necessary, the reaction heat is dissipated by cooling. The reaction is terminated when the refractive index of the mixture does not change any more or only slightly.

The molar ratio between the amide and the acetaldehyde can be as desired; generally, it lies between 1:5 and 2:1. Molar ratios of 1:2 and 1:1 are of advantage. Preferably, the components are used in equimolecular quantities.

The first stage of the process is carried out at normal or elevated pressure. Suitable catalysts are basic and acidic substances. As basic catalysts there may be mentioned tertiary organic bases, for example triethylamine. Strongly basic ion exchangers in the base form may be used advantageously. Preference is given to strong bases such as potassium or sodium hydroxide. Before carrying out the second stage of the process, the basic catalysts should suitably be removed or neutralized.

As acidic catalysts there may be used mineral acids, such as hydrochloric acid, sulfuric acid, phosphoric acid or polyphosphoric acids, and the acidic derivatives thereof, as sulfamic acid, carboxylic acids and sulfonic acids and the acidic derivatives thereof, such as oxalic acid, succinic acid, tartaric acid, citric acid, phthalic acid monoethyl ester, hexadecyl sulfonic acid, toluene sulfonic acids, benzene-1,3-disulfonic acid and their semi-esters. Furthermore, there may be used acidic or acidic hydrolyzing salts, such as sodium hydrogen sulfate, alums, zinc chloride, cobalt chloride or aluminium chloride. Advantageously, there may be used strongly acidic cation exchangers in the acid form. However, mineral acids or sulfonic acids are preferred as acidic catalysts. The quantity of the catalyst varies between 0.01 to 10% by weight based on the amide employed. Generally, the quantities used are in the lower part of the said range when the catalysts are soluble in the reaction mixture, and lie in the upper part when the catalysts used are insoluble.

The second stage of the process is suitably carried out by heating the N-($\alpha$-hydroxyethyl)-amide prepared in the first stage for a short time to a temperature higher than that applied during the first phase and ranging from 100° to 350° C., preferably from 110° to 250° C. The pure N-($\alpha$-hydroxyethyl)-amide can be used for the second stage. It is of advantage to use the reaction mixture obtained, according to the process of the invention, during the first stage. This reaction mixture will be referred to in the following as $M_1$.

The reaction can be carried out by bringing into contact in a suitable way pure N-($\alpha$-hydroxyethyl)-amide or $M_1$ with the catalyst heated to the reaction temperature. This can be done for example by introducing the N-($\alpha$-hydroxyethyl)-amide or $M_1$ into a reaction vessel containing the catalyst preferably in a finely dispersed form or on appropriate supports such as broken tiles or diatomaceous earth. It is also possible to mix the N-($\alpha$-hydroxyethyl)-amide or $M_1$ with the catalyst and to heat to the required temperature. $M_1$ can be used directly with advantage if it still contains catalyst from the first stage of the reaction which can be used for the second.

It is of advantage, if the heating is brought about rapidly, for example by introducing the substances to be reacted in small quantities, for instance dropwise, by injections or spraying or mixed to a hot stream of gas, into a reaction vessel heated to the reaction temperature. It is likewise of advantage to remove the reaction products from the reaction zone according to their formation and to cool them quickly, if desired, so that there will be no or only minor side-reactions. Suitable devices for the second stage of the reaction are, for instance, rotary or thin-layer evaporators as well as circulation tubes or heat exchangers having a low volume compared with the flowing quantity.

The time for which the reaction mixture is exposed to the splitting temperature varies generally from 0.1 second to 5 minutes, advantageously from 0.1 to 60 seconds and preferably from 0.1 to 10 seconds. The reaction products are obtained by distillation. If necessary, the raw product must be neutralized beforehand in case catalyst has been carried along or a volatile acid been used.

Non-reacted starting substances can be recovered and used without further purification in the first stage of the reaction. As catalysts there may be used all acidic catalysts which can be applied in the first stage. Non-volatile or difficultly volatile mineral or sulfonic acids are preferred.

The catalyst is used in quantities of 0.01 to 10% by weight, based on the reaction mixture. As for the quantity of catalyst to be used in a particular case, the same indications must be observed as in the first stage. The second stage can be carried out at normal or reduced pressure, even at a slightly elevated pressure.

It was surprising that the reaction led to the desired vinylamides, since it had to be expected that, under the conditions of the second reaction stage, the N-(α-hydroxyethyl)amides would decompose under reversal of the equation of formation into the starting substances. Likewise, it had to be expected, that thereby, especially because of the presence of acid catalysts, exclusively ethylidene-bis-amides would have formed as usual.

The process of the present invention is above all characterized by the fact that the desired N - vinyl compounds are obtained in a fast proceeding reaction and in high space-time-yields. It can be carried out equally well discontinuously or continuously.

The N-vinyl amides obtained according to the process of the present invention are known compounds capable of being polymerized, according to known methods, in substance or in solvents in the presence of radical or ionic catalysts to products soluble or non-soluble in water and in several organic solvents. The homo- and co-polymerisates have found various applications. They are used, for instance, as textile auxiliaries, adhesives, auxiliaries for dyeings, and solvents for polyvinylchloride. Poly-N-vinyl lactams, especially can be used as binding agents for light-sensitive components in photographic emulsions. The polymers of N-vinyl lactams and open chain vinylamides, used as components in polyacrylo-nitrile fibers, improve their dyeability. Poly-N-vinylpyrrolidone is used in blood expanders.

The following examples illustrate the invention, but they are not intended to limit it thereto; the parts indicated are by weight, unless otherwise stated.

EXAMPLE 1

A mixture of 59 parts of N-methylformamide and 44 parts of acetaldehyde ($n_D^{20}$=1.394) was heated with 1 part of polyphosphoric acid as catalyst for 2 hours under reflux. The reaction mixture ($n_D^{20}$=1.443) was heated to 40° C. and then introduced dropwise into a thin-layer evaporator, the temperature of the latter being kept at 160° C. The pressure was 4 to 6 mm. Hg. At a reactor capacity of 150 ml. the throughput was 80–100 ml./hour. 95 parts of raw product were condensated in the receivers. According to gas chromatographic analysis it contained 33 parts of N - vinyl - N - methylformamide and 30 parts of N-methylformamide. The conversion was 49%, the yield 80%, referred to the reacted amide. The raw product was neutralized and the vinylmethylformamide obtained by fractional distillation. Boiling point 45° C. at 14 mm. Hg.

N-methylacetamide can be obtained by the same method. The boiling point of N-vinylmethylacetamide is 64° C. at 20 mm. Hg.

EXAMPLE 2

In a stirring vessel provided with a reflux condenser, 0.6 part of pulverized potassium hydroxide was added to a mixture of 59 parts of N-methylformamide and 44 parts of acetaldehyde, while stirring. The temperature of the mixture rose soon and was kept under 70° C. by cooling. The reaction was terminated in about 45 minutes. 1 part of phosphoric acid of 90% strength was dissolved in the reaction mixture ($n_D^{20}$=1.445), the latter being reacted, as described in Example 1, in a thin-layer evaporator at 160° C. 93 parts of raw product were obtained containing 27 parts of N - vinyl - N - methylformamide and 35 parts of N-methylformamide. 41% of the formamide had been reacted. The yield of vinyl amide was 79%.

EXAMPLE 3

In a flask provided with a reflux condenser, a mixture of 85 parts of pyrrolidone and 44 parts of acetaldehyde ($n_D^{20}$=1.430) was added to 1.3 parts of polyphosphoric acid, while stirring. The temperature of the mixture increased and was kept below 50° C. by cooling. After 45 minutes, the reaction mixture ($n_D^{20}$=1.482) was reacted, as described in the preceding examples, in a thin-layer evaporator. The reaction temperature was 200° C., the pressure 2–4 mm. Hg. At a reactor capacity of 150 ml. the throughput was 150–170 ml./hour. The raw product, 116 parts, contained 24 parts of pyrrolidone and 56 parts of N-vinylpyrrolidone. 72% of the amide were reacted. The yield of the vinyl compound was 70%. Purification of the vinylpyrrolidone was effected by fractional distillation. Boiling point 87° C. at 10 mm. Hg.

EXAMPLE 4

In a stirring vessel provided with a reflux condenser, 0.3 part of pulverized potassium hydroxide was added to a mixture of 85 parts of pyrrolidone and 44 parts of acetaldehyde, while stirring. The temperature of the mixture increased at an initially strong reflux and was kept below 70° C. by cooling. After about 30 minutes, the reaction was terminated. 1.4 parts of polyphosphoric acid were dissolved in the reaction mixture obtained ($n_D^{20}$=1.487) and the latter introduced into a thin-layer evaporator. The reaction temperature was 200° C., the pressure 3–5 mm. Hg. 114 parts of distillate were obtained containing, according to gas chromatographic analysis, 24 parts of pyrrolidone and 54 parts of N-vinylpyrrolidone, which, at a conversion of 72%, corresponded to a yield of 68%, referred to the pyrrolidone reacted. Before being subjected to fractional distillation, the distillate had been neutralized with a sodium methylate solution.

EXAMPLE 5

83 parts of N-(α-hydroxyethyl)-pyrrolidone were separated from the cooled reaction mixture, obtained according to Example 4, as a crystalline substance (melting point 44°–46° C.). 0.9 part of polyphosphoric acid was dissolved therein by heating and the mixture was reacted in a thin-layer evaporator at 200° C. and 2–4 mm. Hg. The throughput was 150–170 ml. at a reactor capacity of 150 ml. 74 parts of distillate were obtained containing, according to gas chromatographic analysis, 17 parts of pyrrolidone and 34 parts of N-vinyl pyrrolidone. This corresponded to a yield of 70%, referred to non-recovered pyrrolidone.

EXAMPLE 6

A mixture of 113 parts of ε-caprolactam, 44 parts of acetaldehyde and 1.5 parts of polyphosphoric acid were stirred for 1 hour in a flask provided with reflux condenser. By that time the caprolactam had dissolved. The temperature increased and was kept, by cooling, below 60° C. An oily homogeneous reaction mixture, having a refractive index of $n_D^{20}$=1.484 had formed. This mixture was preheated to 40–50° C. and then reacted in a thin-layer evaporator heated to 220° C. at a pressure of 2–4 mm. Hg. 146 parts of the raw product were condensated in the receivers. The partly crystalline product was taken up in methanol and, what catalyst had been carried along, soon neutralized. According to gas chromatographic analysis it contained 35 parts of N-vinyl caprolactam and 74 parts of caprolactam, which corresponded to a yield of 70%, calculated on the reacted lactam. The reaction rate was 35%.

EXAMPLE 7

A mixture of 59 parts of N-methylformamide and 44 parts of acetaldehyde was heated in the presence of 1 part of polyphosphoric acid as catalyst for 4 hours to 35–40° C. The reaction mixture ($n_D^{20}=1.444$) was introduced within 15 minutes at normal pressure into a thin-layer evaporator kept at a temperature of 210° C. According to gas chromatographic analysis, the distillate contained 30 parts of N-methylformamide and 35 parts of N-vinyl-N-methylformamide, which corresponded to a conversion of 49% and a yield of 84%.

EXAMPLE 8

590 parts of N-methylformamide, 440 parts of acetaldehyde and 52 parts of polyphosphoric acid were stirred for 4 hours in a vessel with reflux condenser. The temperature of the mixture increased slowly and was kept, by cooling, below 45° C. The reaction mixture was introduced into a thin-layer evaporator, the temperature of which being maintained at 120–125° C. The pressure was 6–8 mm. Hg. The throughput was 10–12 liter/hour, at a capacity of the evaporator of 5 liters. The raw product was obtained by fractional distillation. 398 parts of N-vinyl-N-methylformamide were isolated. 266 parts of methylformamide were recovered. The conversion was 55%, the yield 84%.

We claim:
1. Process for preparing a N-vinylcarboxylic acid amide of the formula

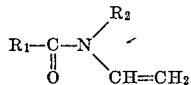

wherein $R_1$ represents hydrogen or alkyl containing 1 to 4 carbon atoms, $R_2$ represents alkyl containing 1 to 4 carbon atoms and $R_1$ and $R_2$ when joined represent alkylene forming a ring with 5 to 8 ring members, which comprises reacting between 20° and 90° C. and at a molar ratio of between 1:5 and 2:1 an amide and acetaldehyde wherein the amide is of the formula

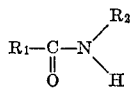

wherein $R_1$ and $R_2$ have the meanings defined above, forming N-(α-hydroxyethyl)-amides and thereafter forming said N-vinyl carboxylic acid amides from said N-(α-hydroxyethyl)-amides by heating the last at a temperature between 100° C. and 350° C. for 0.1 second to 60 seconds in the presence of only an acidic catalyst to produce the vinyl amides.

2. The process as claimed in claim 1, wherein the amide and acetaldehyde are reacted in the presence of a triethylamine, strongly basic ion exchangers in the base form, sodium hydroxide, potassium hydroxide, mineral acids, a carboxylic acid, a sulfonic acid, hexadecyl sulfonic acids, toluene sulfonic acids, a benzene disulfonic acid and its semi-ester, or strongly acidic cation exchangers in the acid form.

3. The process as claimed in claim 1, wherein the N-(α-hydroxyethyl)-amide is heated in the presence of hydrochloric acid, sulfuric acid, phosphoric acid, polyphosphoric acids, sulfamic acid, a mono carboxylic acid, oxalic acid, succinic acid, tartaric acid, citric acid, phthalic acid monoethyl ester, hexadecyl sulfonic acid, toluene sulfonic acids, benzene-1,3-disulfonic acid and the semi-esters of said difunctional acids, sodium hydrogen sulfate, alums, zinc chloride, cobalt chloride, aluminum chloride or strongly acidic cation exchangers in the acid form.

References Cited

UNITED STATES PATENTS 3,377,340   4/1968   Hartwimmer et al. __ 260—239.3

OTHER REFERENCES

Smith: "The Chemistry of Open Chain Organic Nitrogen Compounds," vol. 1 (Benjamin) (1965).

HENRY R. JILES, Primary Examiner

R. T. BOND, Assistant Examiner

U.S. Cl. X.R.

260—294.7, 326.5, 561